United States Patent [19]
Shuert

[11] Patent Number: 5,401,347
[45] Date of Patent: Mar. 28, 1995

[54] METHOD OF MAKING A PANEL STRUCTURE AND PALLET UTILIZING SAME

[76] Inventor: Lyle H. Shuert, 70 Kingsley Manor Dr., Bloomfield Hills, Mich. 48304

[21] Appl. No.: 993,762

[22] Filed: Dec. 18, 1992

[51] Int. Cl.⁶ .................. B32B 3/30; B29C 51/02; B65D 19/32
[52] U.S. Cl. .................. 156/245; 156/292; 156/196; 156/309.6; 156/285; 428/180; 108/51.1; 108/901; 264/545
[58] Field of Search .............. 156/210, 292, 196, 293, 156/227, 308.4, 309.6, 245, 285, 242; 264/545, 510, 511; 108/51.1, 901; 428/178, 179, 180

[56] References Cited

U.S. PATENT DOCUMENTS

| | | | |
|---|---|---|---|
| 3,444,034 | 5/1969 | Hewett | 156/156 X |
| 3,527,664 | 9/1970 | Hale | 428/179 |
| 3,642,566 | 2/1972 | Figge | 156/196 X |
| 4,279,204 | 7/1981 | Propst | 108/53.3 |
| 4,348,442 | 9/1982 | Figge | 428/179 X |
| 4,397,247 | 8/1983 | Lemelson | 108/57.1 |
| 4,488,496 | 12/1984 | Polacco | 108/51.3 |
| 4,495,237 | 1/1985 | Patterson | 428/180 X |
| 4,518,643 | 5/1985 | Francis | 428/179 X |
| 4,606,278 | 8/1986 | Shuert | 108/51.1 |
| 4,879,956 | 11/1989 | Shuert | 108/53.3 |
| 4,967,533 | 11/1990 | Weisse | 428/180 X |
| 5,030,501 | 7/1991 | Colvin et al. | 428/180 X |

FOREIGN PATENT DOCUMENTS

750096 1/1967 Canada.
197624 7/1992 Japan .................. B32B 3/26

*Primary Examiner*—Michael W. Ball
*Assistant Examiner*—Francis J. Lorin
*Attorney, Agent, or Firm*—Young, MacFarlane & Wood

[57] ABSTRACT

A twin sheet plastic panel structure, a twin sheet plastic pallet utilizing the panel structure, and a methodology for forming the panel structure and pallet. The panel structure is formed by thermoforming an upper plastic sheet to include rows of hollow bosses extending downwardly from the main body of the sheet; thermoforming a lower plastic sheet to include rows of hollow bosses extending upwardly from the main body portion of the sheet; and bringing the sheets together while still in a heated flowable state to position the bosses of the upper sheet in intermeshing relation to the bosses of the lower sheet so that the annular side wall portions of the upper and lower bosses fuse together, the bottom walls of the upper sheet bosses are fused to the upper surface of the main body portion of the lower sheet, and the upper walls of the lower sheet bosses are fused to the lower surface of the main body portion of the upper sheet to form a series of parallel rigid column structures between the sheets. In the case of the pallet, the fused together upper and lower sheets coact to define a platform structure for the pallet and the upper and lower sheets further coact to define a plurality of legs extending downwardly from the platform structure to position the platform structure in spaced relation to a support surface.

14 claims, 8 Drawing Sheets

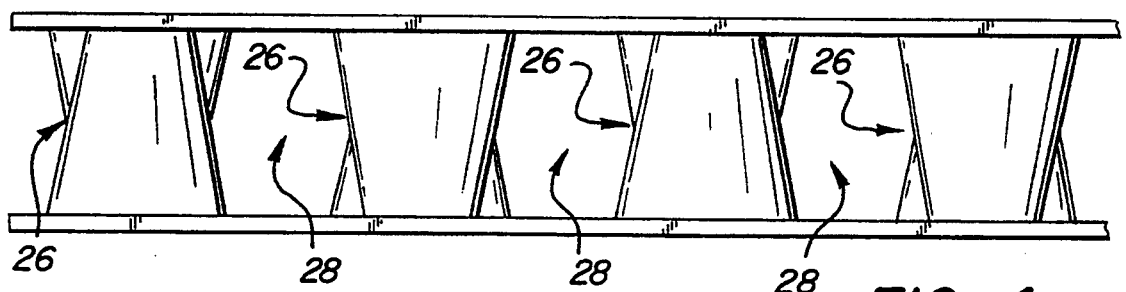
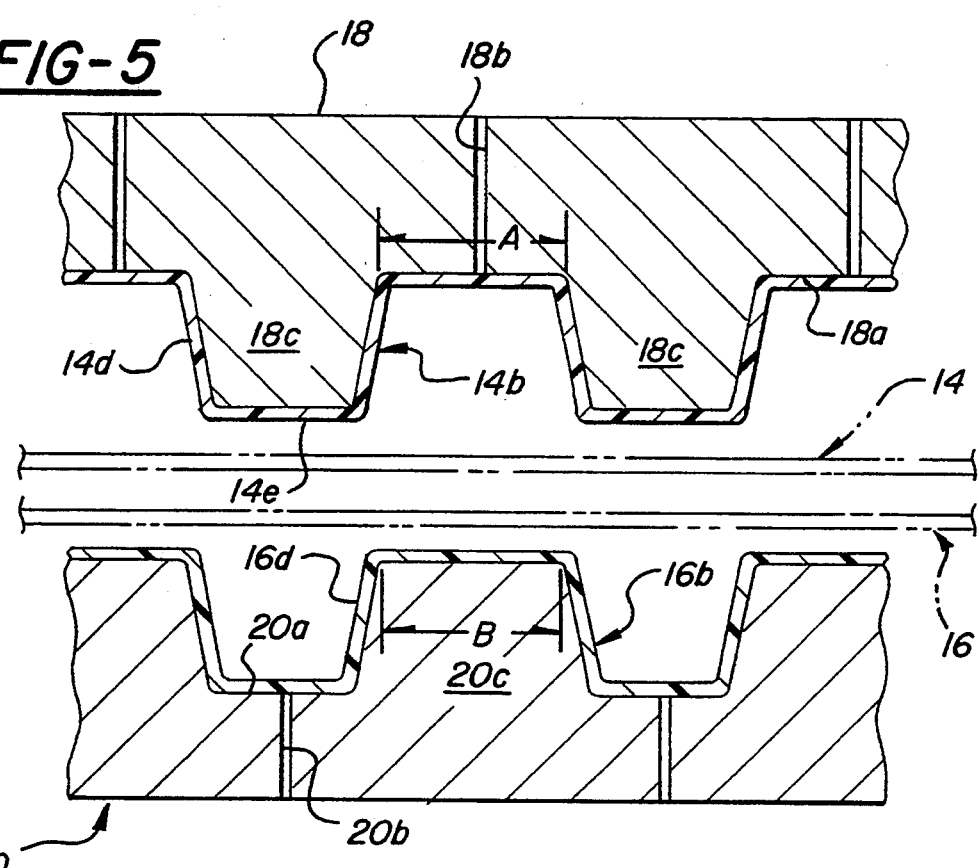
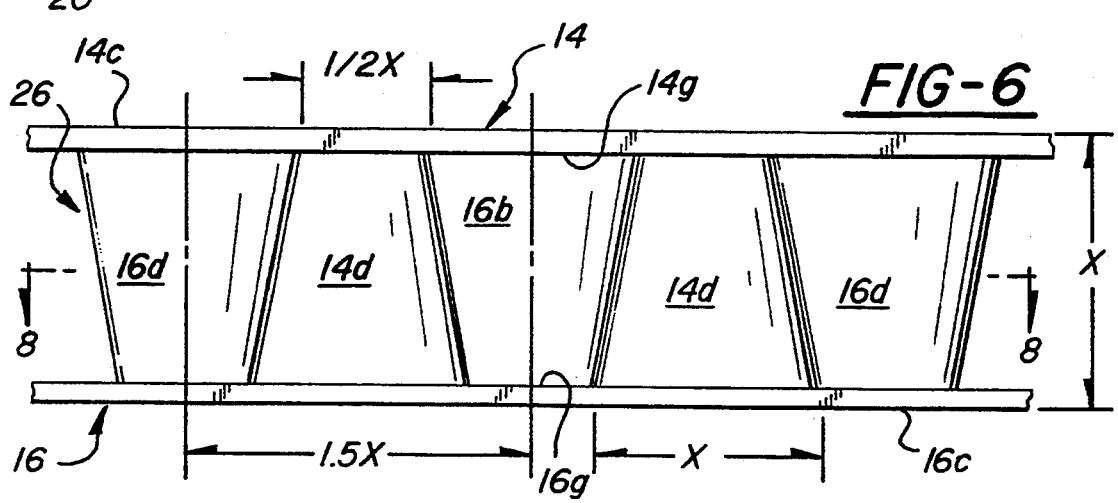

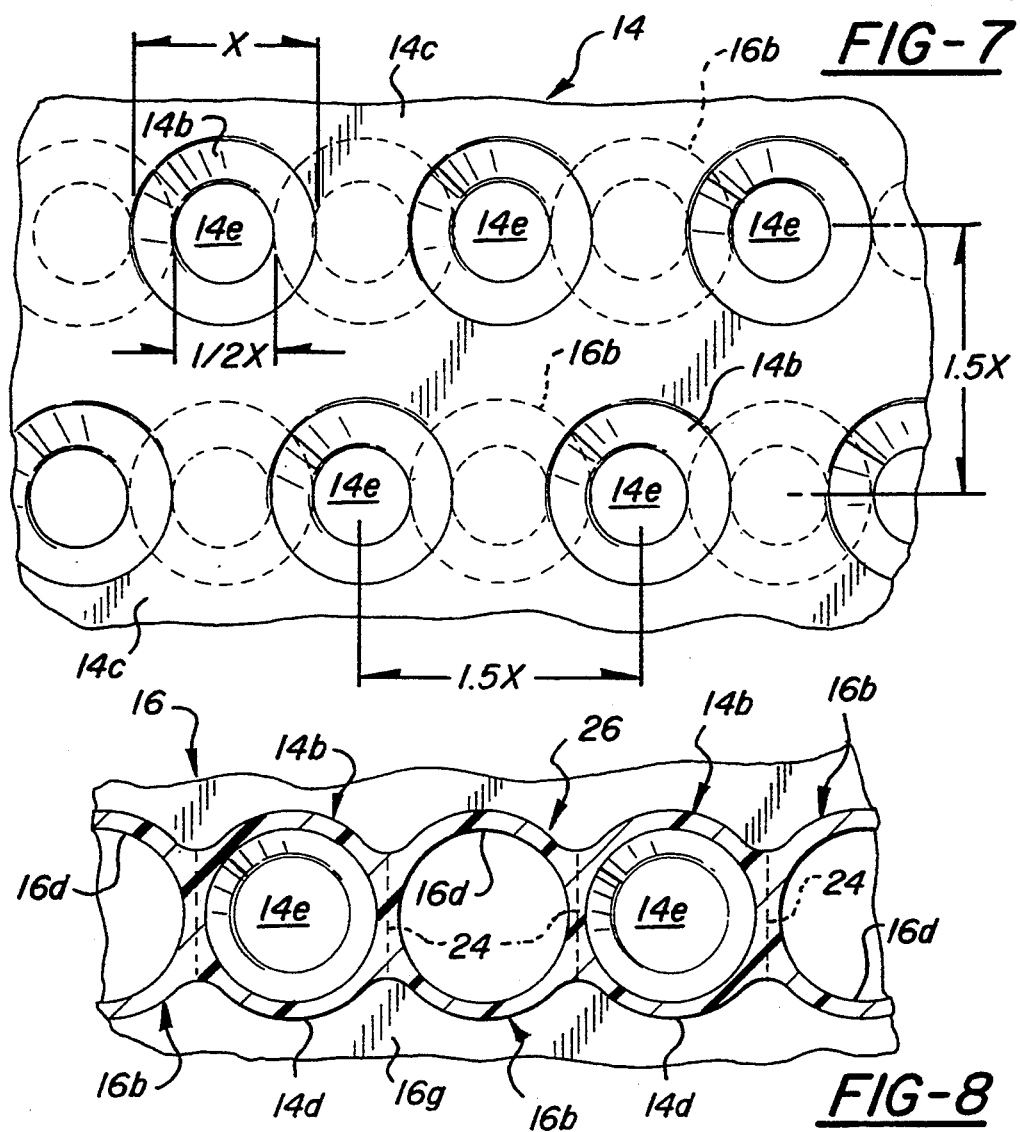
FIG-7
FIG-8
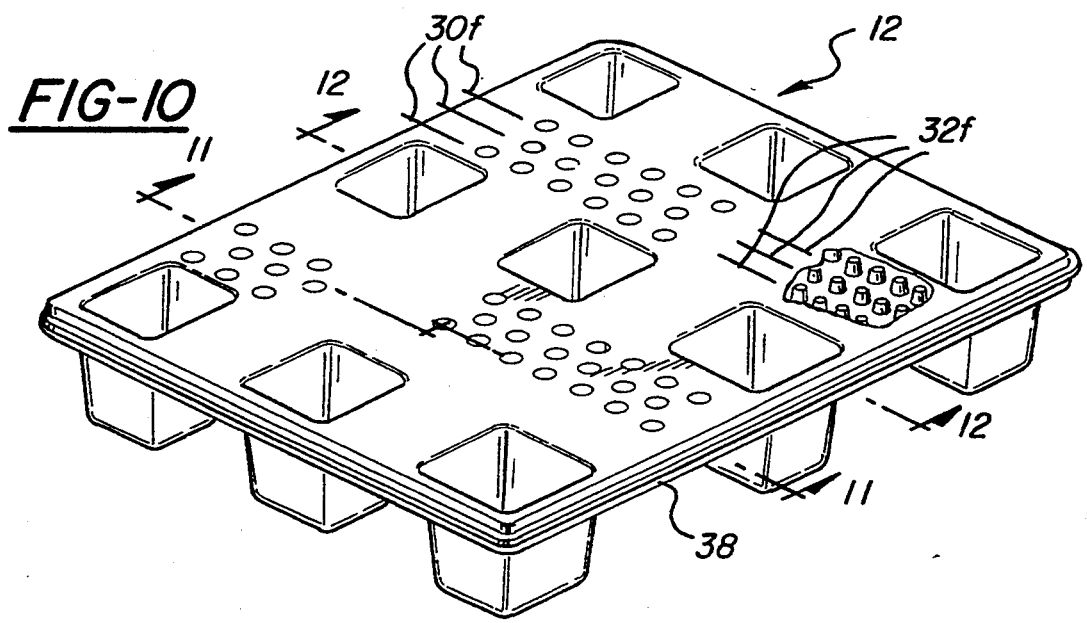
FIG-10

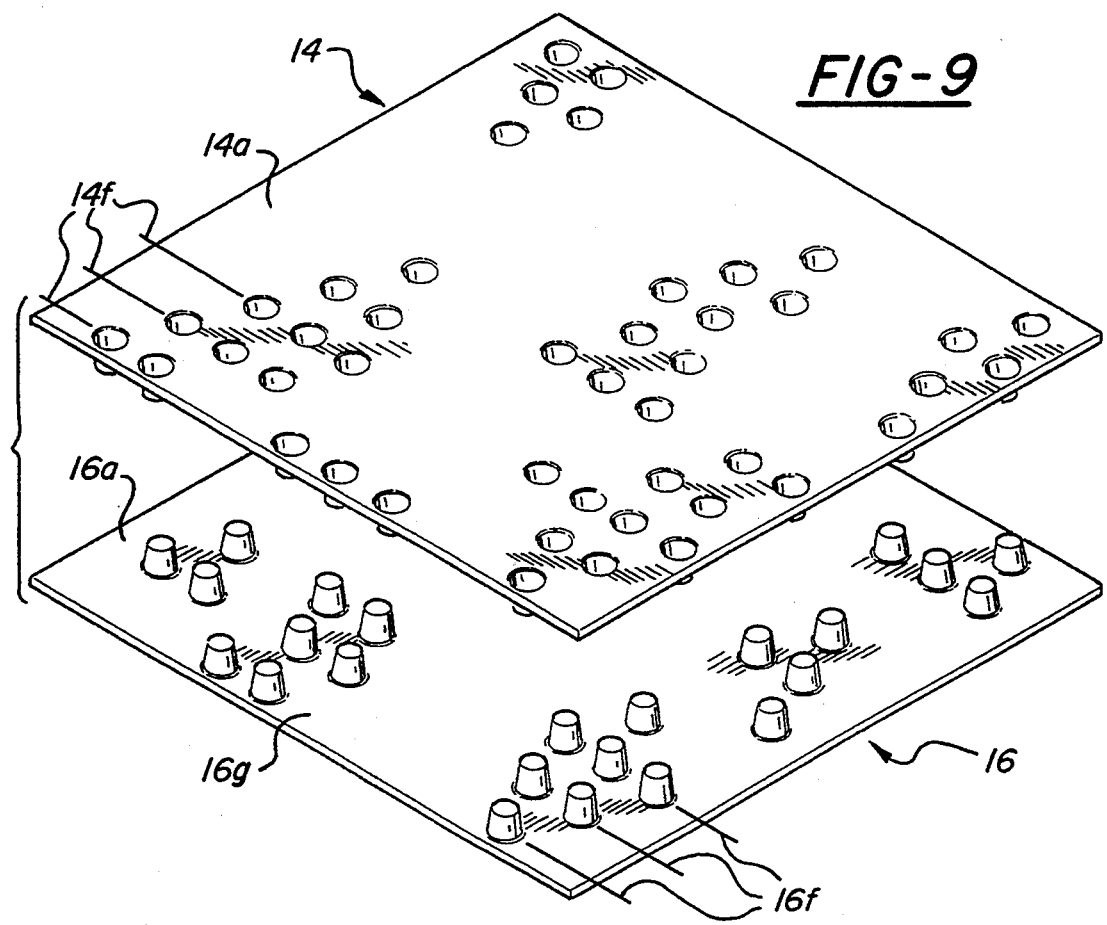
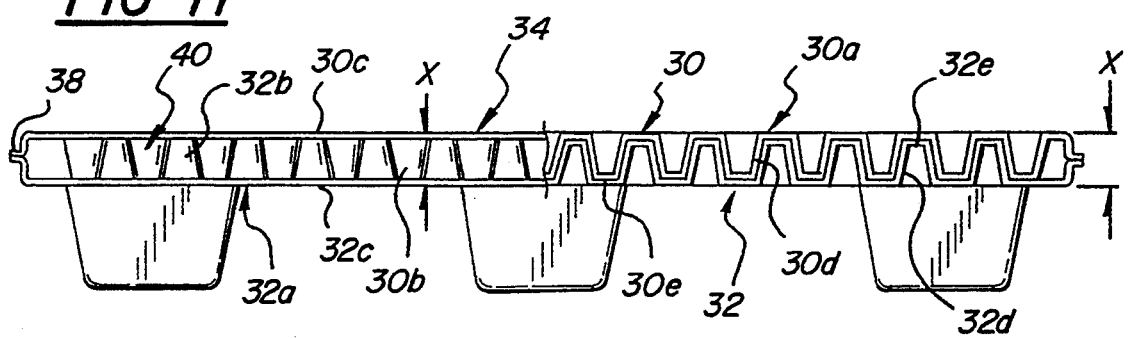
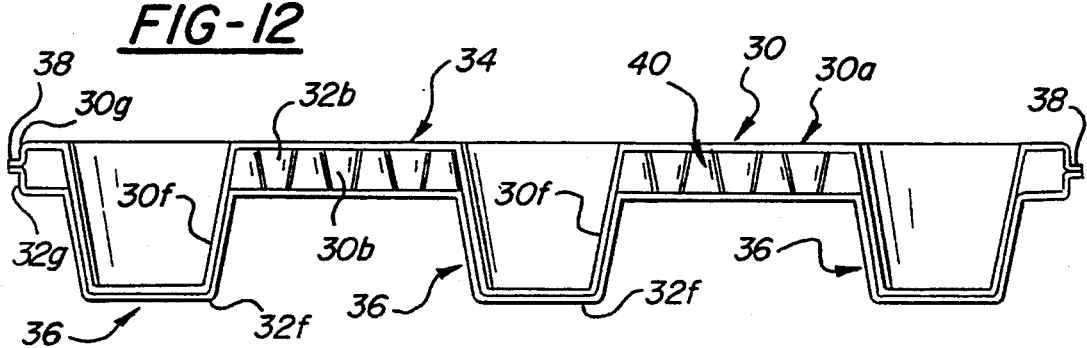

METHOD OF MAKING A PANEL STRUCTURE AND PALLET UTILIZING SAME

BACKGROUND OF THE INVENTION

This invention relates to panel structures and to plastic pallets embodying panel structures according to the invention.

Panel structures are in wide use for construction purposes and fabricating purposes. Prior art panel structures have been formed of either metal, a paper product such as cardboard, wood, or synthetic materials such as plastic. Panel structures ideally are lightweight, strong, durable and maintenance-free, provide all-weather performance, and are relatively inexpensive. Whereas a plurality of metal, paper, wood, and plastic panel structures have been proposed over the years, none have totally satisfied all of the above-noted criteria.

Panel structures are also widely used in packaging and, specifically, in the formation of pallets. Pallets have traditionally been formed of wood. Wood pallets, however, have many disadvantages. For example, they are subject to breakage and thus are not reusable over extended periods of time. Wood pallets also take up a considerable amount of valuable floor space in the warehouse when they are not in use. In an effort to solve some of the problems associated with wood pallets, plastic pallets have been developed and employed with some degree of success. In one generally successful form of plastic pallet design, upper and lower plastic sheets are formed in separate molding operations and the two sheets are then selectively fused or knitted together in a suitable press to form a reinforced double wall or "twin sheet" structure. These twin sheet plastic pallets, although substantially more durable than the wooden pallets that they replace, tend to have a substantially higher initial cost than the corresponding wooden pallets due in large part to the relatively high cost of the raw plastic material required to form the pallet. It is therefore critical that the twin sheet type of pallet embody a structural design that maximizes the structural strength of the pallet for a given amount of plastic material employed to form the pallet. One form of twin sheet type plastic pallet that provides high structural strength for a given amount of plastic material is shown in applicant's U.S. Pat. No. 4,879,956. However, even the improved design of this patent is unable to provide the necessary rigidity required for many pallet applications without utilizing increased amounts of plastic material and thereby adding to the expense of the pallet.

SUMMARY OF THE INVENTION

This invention is directed to the provision of an improved panel structure that is lightweight, strong, durable, provides all-weather performance, and is relatively inexpensive.

This invention is more specifically directed to the provision of an improved plastic pallet that provides extremely high structural strength for a given amount of plastic material employed to form the pallet.

The twin sheet panel structure of the invention comprises a first plastic sheet including a planar main body portion having inner and outer surfaces and a second plastic sheet positioned in parallel spaced relation to the first plastic sheet and including a main body portion having inner and outer surfaces. The first sheet further includes a plurality of spaced hollow bosses opening in the outer surface of the first sheet main body portion and including annular side wall portions extending inwardly from the first sheet main body portion and terminating in inner wall portions fused in spaced relation to the inner surface of the main body portion of the second sheet, and the second sheet further includes a plurality of spaced hollow bosses opening in the outer surface of the second sheet main body portion and including annular wall portions extending inwardly from the second sheet main body portion and terminating in inner wall portions fused in spaced relation to the inner surface of the first sheet main body portion.

According to an important feature of the invention, the annular side wall portions of some of the first sheet bosses are fused to the annular side wall portions of some of the second sheet bosses. The fused together annular side wall portions of the first and second sheets coact to provide an extremely rigid panel structure for a given amount of plastic material.

According to a further feature of the invention, the first sheet bosses are arranged in rows with the bosses in each row laterally spaced from each other and the second sheet bosses fit into the spaces between the first sheet bosses. The positioning of the first sheet bosses between the second sheet bosses, with the first sheet bosses fused to the second sheet and the second sheet bosses fused to the first sheet, provides an extremely rigid panel structure for a given amount of plastic material.

According to a further feature of the invention, the bosses are arranged on each sheet in a plurality of generally parallel laterally extending rows with the bosses in each row spaced laterally from each other, and the bosses in a row of the first sheet are interdigitated with respect to the bosses in a corresponding row of the second sheet with the adjacent side wall portions of the interdigitated bosses fused together. This arrangement has the effect of forming a plurality of rigid column structures between the sheets corresponding to the rows and produces an extremely rigid panel structure for a given amount of plastic material.

In the invention plastic pallet, the pallet comprises a twin sheet platform structure formed in accordance with the above-noted features of the invention panel structure and the pallet further includes a plurality of spaced legs extending downwardly from the platform structure to position the platform structure in upwardly spaced relation to a support surface on which the legs are positioned.

Also disclosed is a further form of a plastic pallet formed in accordance with the above-noted features of the invention panel structure but embodying a double faced configuration including an upper panel structure according to the invention defining a platform section for the pallet and a lower panel structure according to the invention defining a flat base on which the pallet may rest.

The invention also provides a methodology for forming an improved panel structure as well as a methodology for forming an improved pallet structure.

BRIEF DESCRIPTION OF THE DRAWINGS

FIG. 4 is a fragmentary view looking in a direction of the arrow 4 in FIG. 1;

FIG. 5 is a fragmentary view showing steps in the methodology of the present invention;

FIG. 6 is a fragmentary view on an enlarged scale looking in the direction of the arrow 6 in FIG. 1

FIG. 7 is a fragmentary plan view of the invention panel structure;

FIG. 8 is cross-sectional view taken on lines 8—8 of FIG. 6;

FIG. 9 is an exploded view of the invention panel structure;

FIG. 10 is a perspective view of a pallet according to the invention;

FIGS. 11 and 12 are cross-sectional views taken respectively on lines 11—11 and 12—12 of FIG. 10;

DETAILED DESCRIPTION OF THE PREFERRED EMBODIMENTS

Figure 1:
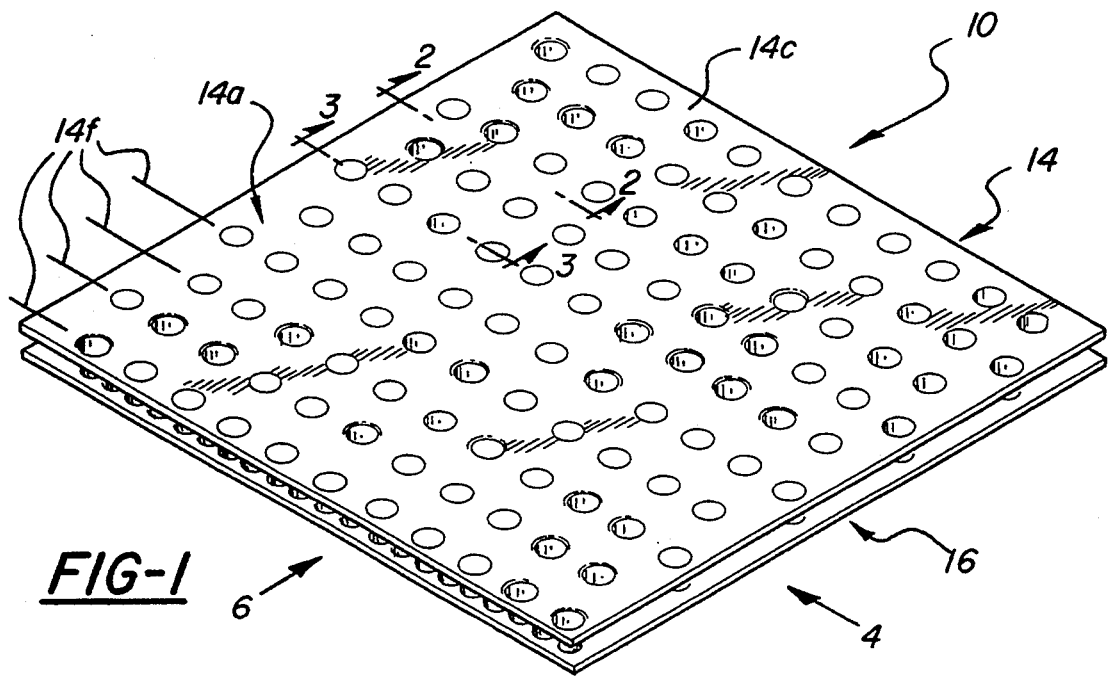
FIG. 1 is a perspective view of a panel structure according to the invention.

In broad overview, the panel structure 10 seen in FIGS. 1-9 and the pallet seen in FIGS. 10-12 are both preferably formed in a vacuum forming process preferably embodying a plastic twin sheet construction employing two polyethylene sheets or skins which awe selectively thermoformed and are then fused or knitted together at various points, while still in a heated state, to form the panel structure or the pallet.

Panel structure 10 is formed from a thermoformed, selectively configured upper sheet 14 and a thermoformed, selectively configured lower sheet 16. In the disclosed panel structure, each sheet 14 and 16 has a generally rectangular configuration but the configuration of the sheets will of course vary depending upon the desired configuration of the final panel structure.

Sheet 14 is formed in known manner in coaction with an upper vacuum forming mold 18 and sheet 16 is formed in known manner in coaction with a lower vacuum forming mold 20. Specifically, sheet 14 is heated, positioned in underlying relation to the mold 18, and then sucked upwardly into conformance with the surface 18a of the mold 18 utilizing vacuum ports 18b. Similarly, sheet 16 is heated, positioned in overlying relation to mold 20, and sucked downwardly into conformance with the surface 20a of mold 20 utilizing vacuum ports 20b. After the sheets have been thus thermoformed, and with the sheets still in a heated flowable state, the molds 18 and 20 are moved together to selectively fuse the upper sheet to the lower sheet.

Molds 18 and 20 are configured such that, following the thermoforming operation, each sheet includes a generally planar main body portion and a plurality of spaced hollow bosses extending from the planar main body portion.

Specifically, upper sheet 14 is thermoformed to include a generally planar main body portion 14a and a plurality of spaced hollow bosses 14b opening in the upper or outer surface 14c of the main body portion and including downwardly tapering conical annular side wail portions 14d extending downwardly from the main body portion and terminating in inner or bottom circular wall portions 14e. Bosses 14b are arranged in rows 14f with each row staggered with respect to the next adjacent row so that the bosses in one row are positioned generally between adjacent bosses in adjacent rows.

Similarly, lower sheet 16 is thermoformed to include a main body portion 16a and a plurality of spaced hollow bosses 16b opening in the lower or outer surface 16c of the main body portion and including upwardly tapering conical annular wall portions 16d extending upwardly from the main body portion 16a and terminating in upper or inner circular wall portions 16e. Bosses 16b are arranged in rows 16f with each row staggered with respect to the next adjacent row so that a boss in one row is positioned between adjacent bosses in an adjacent row.

Figure 2:
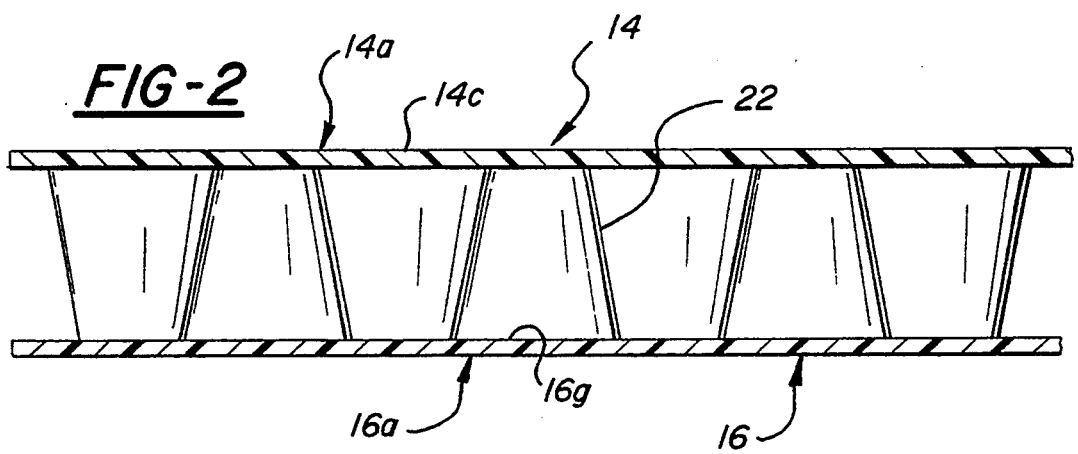
FIGS. 2 and 3 are cross-sectional views taken respectively on lines 2—2 and 3—3 of FIG. 1.
Figure 3:
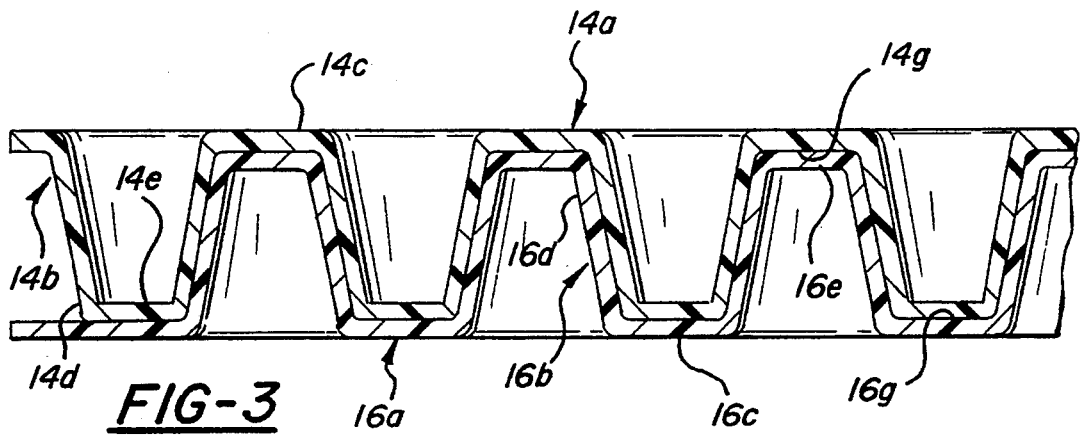

Rows 16f are also staggered with respect to the corresponding rows 14f in the upper sheet so that when the sheets 14 and 16 are fitted together to form the panel structure, each boss 14b of upper sheet 14 fits interdigitally between a pair of adjacent bosses 16b of the lower sheet and each boss 16b of the lower sheet fits interdigitally between a pair of adjacent bosses 14b of the upper sheet. The downward angle or taper of the bosses 14b is complementary to the upward angle or taper of the bosses 16b so that when the bosses are fitted or meshed together, and as best seen in FIG. 2, the bosses fit together along angular interfaces 22.

Since the sheets are fitted together while still in a heated, flowable state, the bosses are fused together along their angled interfaces 22. Further, since the bosses 14b and 16b have equal vertical extents or heights, the respective walls 14e and 16e of the bosses are fused to the respective confronting faces of the main body portions of the respective sheets. Specifically, the lower or inner wall 14e of an upper sheet boss 14b is fused to the upper surface 16g of lower sheet main body portion 16a at a location between a respective pair of lower sheet bosses 16b, and the upper or inner wall 16e of a lower sheet boss 16b is fused to the lower or inner surface 14g of upper sheet main body portion 14a between a respective pair of upper sheet bosses 14b.

As best seen in FIG. 5, the sheets are configured such that bosses 14b and 16b have identical configuration and further such that the dimension A measured across the valley or root of the upper mold 18 between adjacent mold boss configurations 18c is identical to the dimension B measured across the top of the boss configuration 20c of the lower mold. This configuring of the upper and lower molds provides an interference or overlapping fit as between the upper and lower bosses as the sheets are pressed together so that the upper and lower bosses, rather than merely fusing along a line of angular contact, fuse along a relatively wide area of contact as seen by the dashed lines 24 in FIG. 8. As best seen in FIG. 8, the fused together bosses coact to form a plurality of rigid column structures 26 between the upper and lower sheets corresponding in arrangement and orientation to the boss rows 14f and 16f of the upper and lower sheets. As best seen in FIG. 4, spaces or openings 28, running the entire width of the panel structure, are formed between rigid column structures 26.

Whereas the dimensions of the individual bosses, the spacing between successive bosses in earth row, and the spacing between rows will vary depending upon the particular application for which the panel structure is intended, certain dimensional relationships as between the boss configurations, boss spacings, and row spacings have been found to be particularly advantageous in terms of producing an extremely strong panel structure for a given amount of plastic material. Specifically, and as best seen in FIGS. 6 and 7, a particularly strong panel structure is provided by relating the boss and other dimensions to the overall thickness X of the panel structure such that the major dimension of each boss (i.e., the dimension of the boss as it opens in the associated main body structure) is equal to X; the minor dimension of each boss (i.e., the dimension of the boss at its inner wall) is equal to one half X; the distance centerline to centerline between successive bosses in each row is equal to 1.5X; and the distance centerline to centerline between adjacent rows is equal to 1.5X. This specific dimensional interrelationship has been found to allow the sheets to draw smoothly, and without excessive thinning, over the respective molds to provide a final panel structure that is extremely strong and rigid in comparison to the amount of plastic material utilized.

The pallet 12 seen in FIGS. 10–12 utilizes a panel structure corresponding to the panel structure 10, and is formed in a manner generally similar to the formation of panel structure 10, except that the upper and lower sheets of the twin sheet pallet are further selectively thermoformed to provide spaced legs extending downwardly from the main body or platform structure of the pallet to position the platform structure in upwardly spaced relation to a support surface on which the legs are positioned.

Specifically, pallet 12 includes upper and lower plastic sheets 30 and 32; upper sheet 30 includes a main body portion 30a and a plurality of spaced hollow bosses 30b opening in the upper surface 30c of the main body portion and including tapered conical annular side wall portions 30d extending downwardly from the upper sheet main body portion and terminating in inner or bottom circular wall portions 30e; lower sheet 32 includes a main body portion 32a and a plurality of spaced hollow bosses 32b opening in the lower surface 32c of the main body portion and including tapered conical annular side wall portions 32d extending upwardly from the lower sheet main body portion and terminating in upper or inner circular wall portions 32e; the bosses in the upper sheet are arranged in rows 30f with each row staggered with respect to the next adjacent row so that a boss in one row is positioned between adjacent bosses in the next adjacent row; the bosses in the lower sheet are arranged in rows 32f that are staggered with respect to each adjacent row in the lower sheet and are also staggered with respect to the corresponding rows in the upper sheet so that the upper and lower bosses fit together in intermeshing fashion in the manner described with respect to the panel structure 10; the intermeshed and fused together upper and lower sheets coact to define a platform structure 34 of the pallet including rigid column structures 40 extending across the platform structure; and the upper and lower sheets are further selectively thermoformed to define downwardly extending leg portions 30f and 32f which are fused together in nesting relationship as the sheets are brought together to define a plurality of spaced legs 36 extending downwardly from platform structure 34 to position the platform structure in upwardly spaced relation to a support surface on which the pallet is positioned. For example, for a nine-legged pallet, the upper and lower sheets are configured to define four corner legs 36, a further leg 36 along each side edge of the pallet between corner legs, and a central leg positioned at the proximate midpoint of the pallet. The upper and lower sheets may be further configured to define edge portions 30g and 32g which are fused together as the sheets are brought together to form a peripheral bead 38 extending around the periphery of the pallet and sealing off the interior of the platform section 34.

As with the panel structure, the relative dimensions of the bosses, the spacing between bosses in a given row, and the spacing between adjacent rows may vary depending upon the particular application for which the pallet is intended but, also as with the panel structure 10, a particularly strong pallet structure for a given amount of plastic material has been found to result from a pallet in which the various parameters are related to the thickness X of the platform structure 34 such that each boss has a major dimension equal to X and a minor dimension equal to one half X; the distance between centerlines of successive bosses in each row is equal to 1.5X; and the distance between centerlines of adjacent rows is equal to 1.5X. As previously noted with respect to panel structure 10, these specific parameters have been found to provide a smooth draw or flow behavior of the plastic sheets as the plastic material is drawn over the bosses of the molds with minimum thinning of the plastic material even in the deep draw sections, and has been found to produce an extremely rigid pallet for a given amount of plastic material employed to form the pallet.

Figure 13:
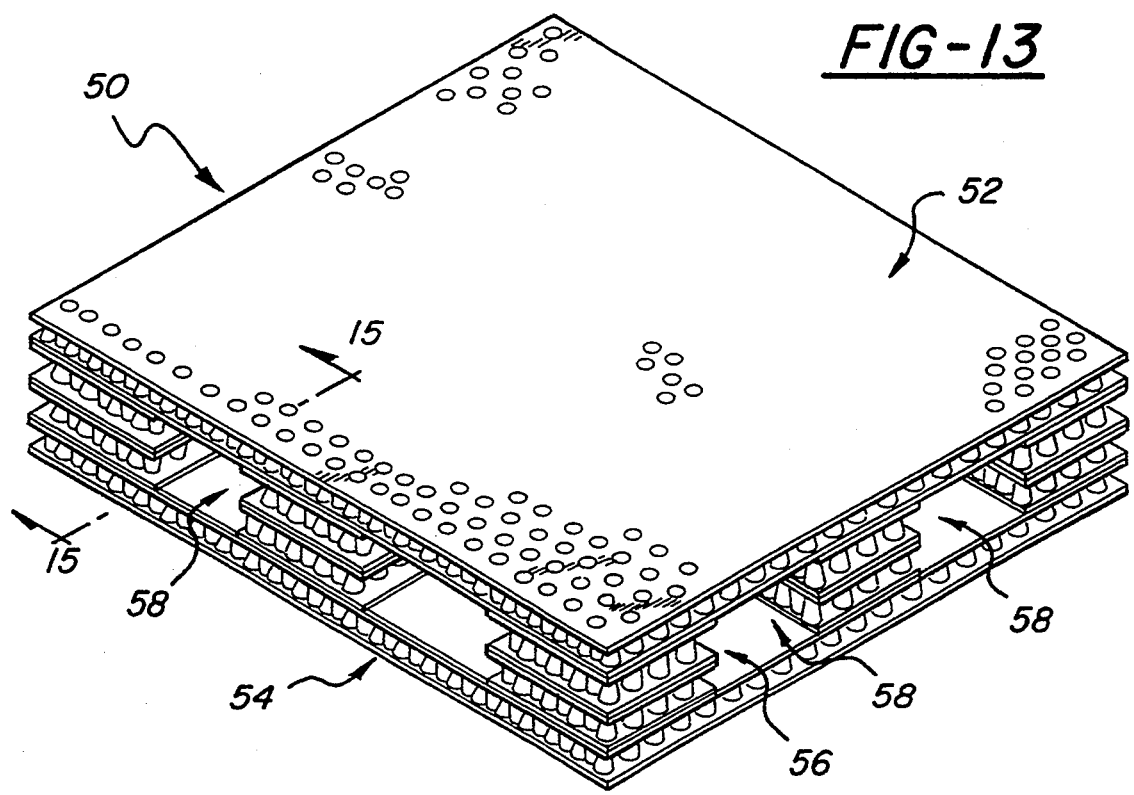
FIG. 13 is a perspective view of a double faced pallet according to the invention.
Figure 16:
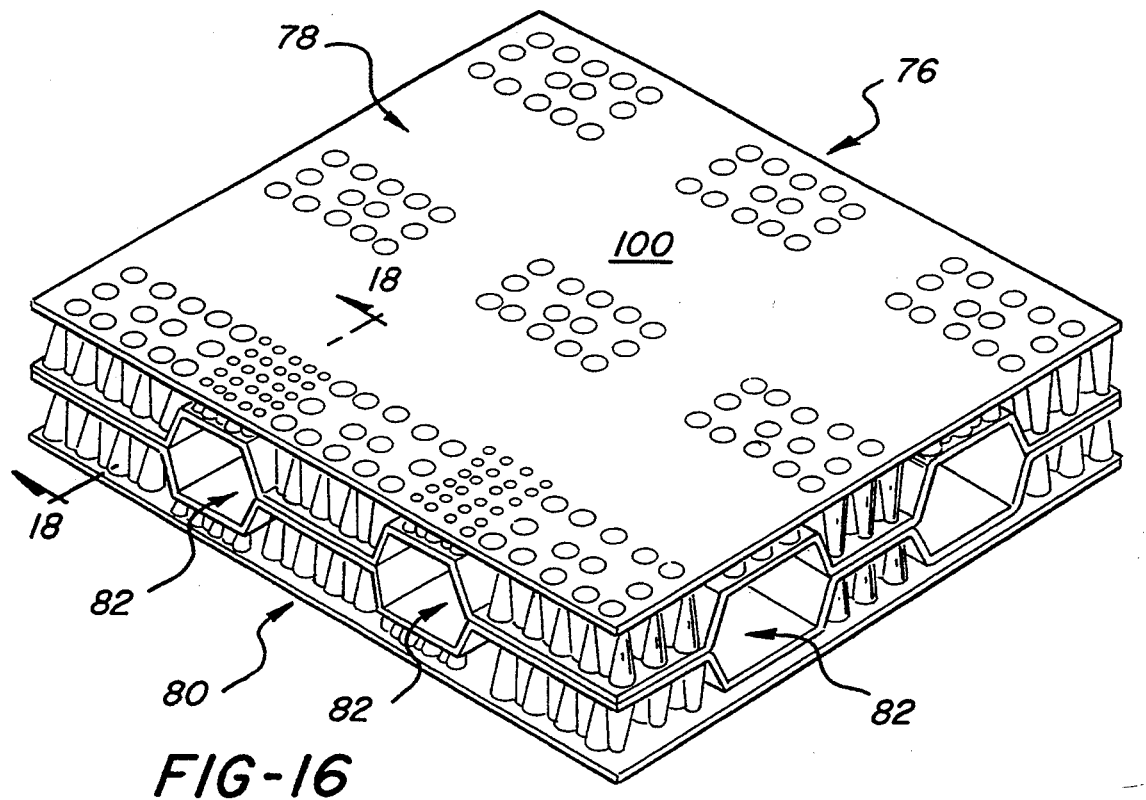
FIG. 16 is a perspective view of another double faced pallet according to the invention.
Figure 14:
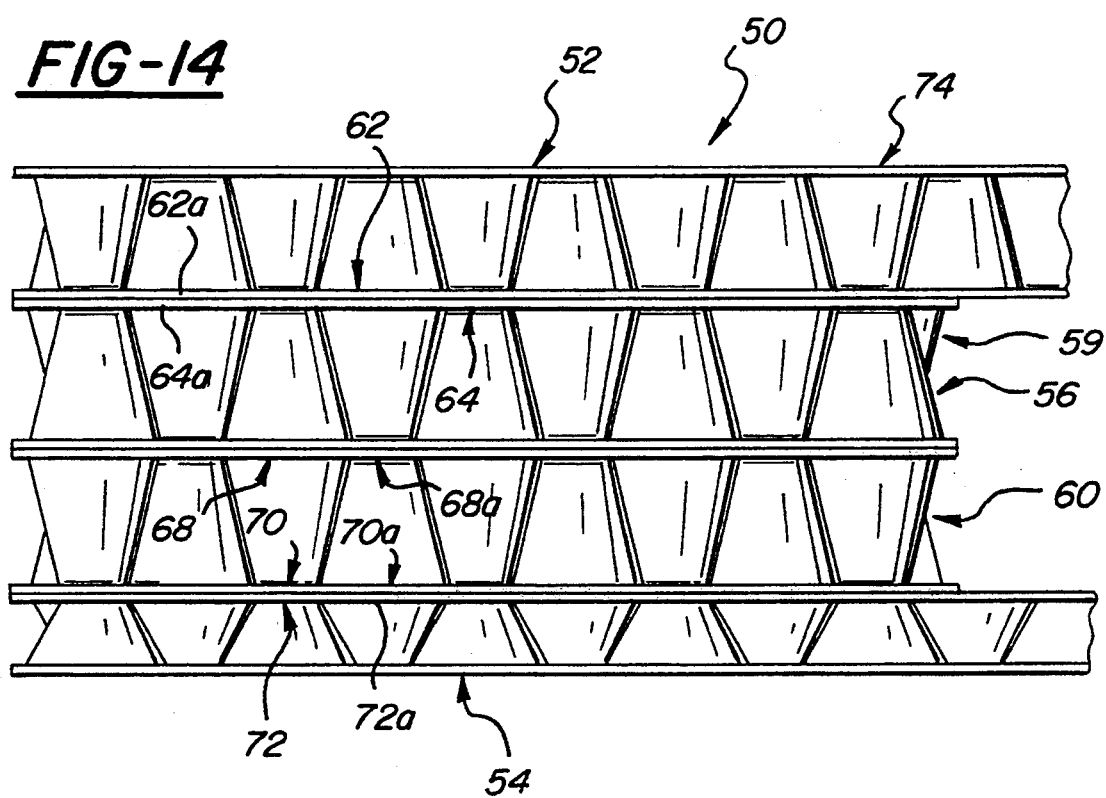
FIG. 14 is a fragmentary side view of the pallet of FIG. 13.
Figure 15:
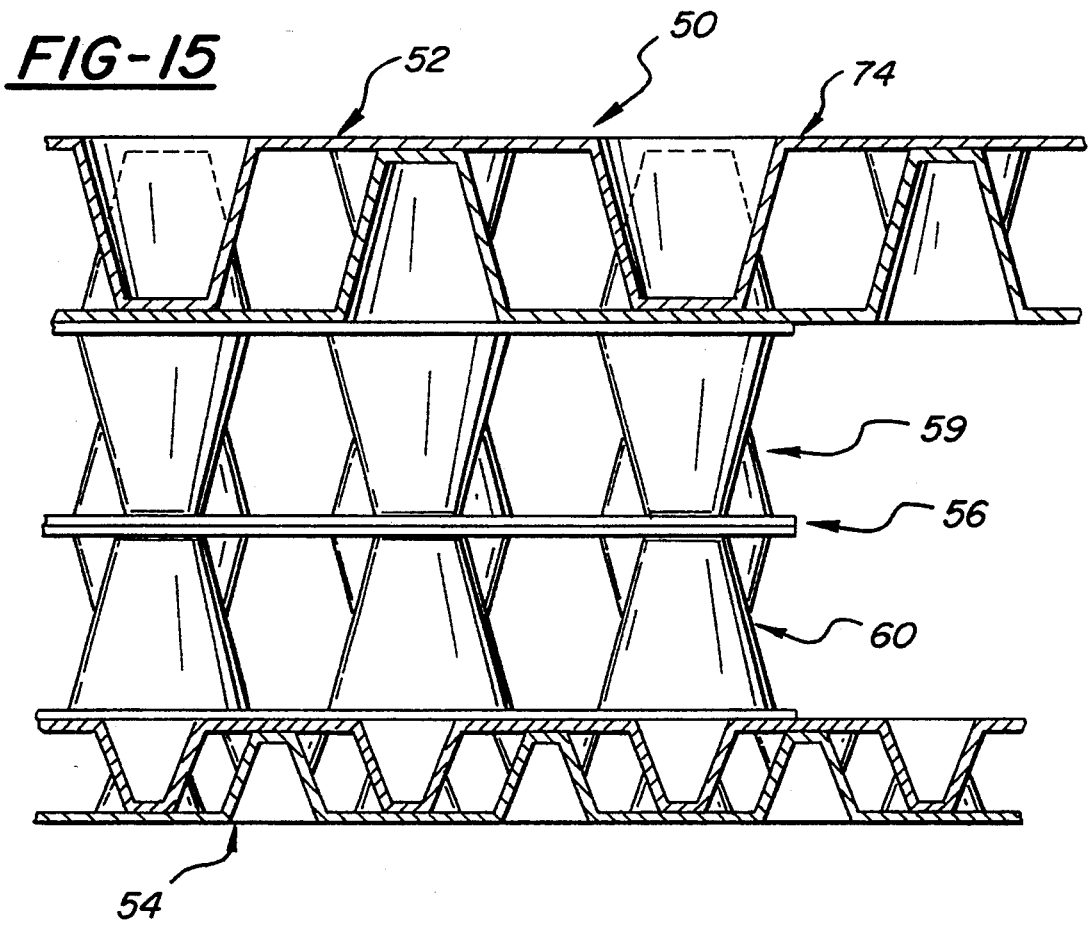
FIG. 15 is a cross-sectional view taken on line 15—15 of FIG. 15.
Figure 17:
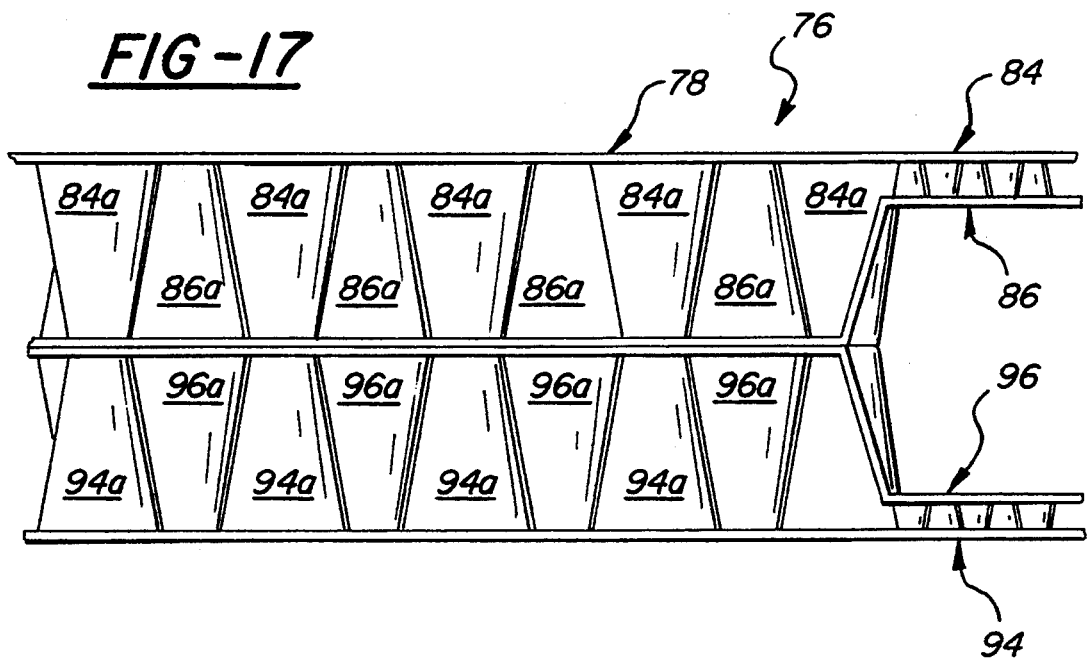
FIG. 17 is a fragmentary side view of the pallet of FIG. 16.

The double faced pallet 50 seen in FIGS. 13–15 utilizes a panel structure according to the invention to form the upper or platform section of the pallet and a further panel structure according to the invention to form a flat lower base portion for the pallet on which the pallet may rest, and is further configured to define pillar structures interconnecting the upper and lower panel structures and also embodying the constructional features of the panel structure of the invention.

Specifically, the double faced pallet 50 in FIGS. 13–15 includes an upper panel structure 52 corresponding to the panel structure 10 of FIG. 1, a lower panel structure 54 corresponding to the panel 10 of FIG. 1 but having a lesser thickness than the panel structure 52, and a plurality of pillar structures 56 (for example nine, including four corner pillar structures, a pillar structure intermediate each pair of corner pillar structures, and a central pillar structure) interconnecting the upper and lower panel structures and coacting to define forklift entry passages 58 to allow entry of a forklift truck from any side of the pallet.

Each pillar structure 56 is also formed utilizing panel structures according to the invention. Specifically, each pillar structure 56 includes stacked upper and lower panel structures 59 and 60 with each upper and lower panel structure corresponding to the construction of the panel of FIG. 1 but having reduced dimensions as compared to the upper and lower panel structures 52 and 54 so as to provide the prescribed nine spaced pillar structures defining forklift corridors 58 therebetween. As shown, the panel structures 59 and 60 constituting each pillar 56 may have a thickness corresponding to the upper panel structure 52 and the lower panel structure 54 may have a thickness approximately ½ the thickness of the panel structures 52, 59 and 60.

The main body portion 62a of the lower sheet 62 of the upper panel structure 52 is fused to the main body portion 64a of the upper sheet 64 of the panel structure 59; the main body portion 66a of the lower sheet 66 of panel structure 59 is fused to the main body portion 68a of the upper sheet 68 of the panel structure 60; and the main body portion 70a of the lower sheet 70 of the panel structure 60 is fused to the main body portion 72a of the upper sheet 72 of the panel structure 54 so that each set of intermediate panel structures 59 and 60 coact with selected portions of the upper and lower panel structures 52 and 54 to form a rigid column interconnecting the upper and lower panel structures and so that the panel structures 56 in combination coact to rigidly interconnect the upper and lower panel structures at nine spaced locations corresponding to the usual leg locations in a standard nine-legged pallet. In the finished pallet, lower panel structure 54 defines a base structure on which the pallet may rest, upper panel structure 52 defines a platform structure defining an upwardly facing load receiving surface 74, and the pallet may be selectively moved utilizing forklifts positioned in the passages 58.

Figure 18:
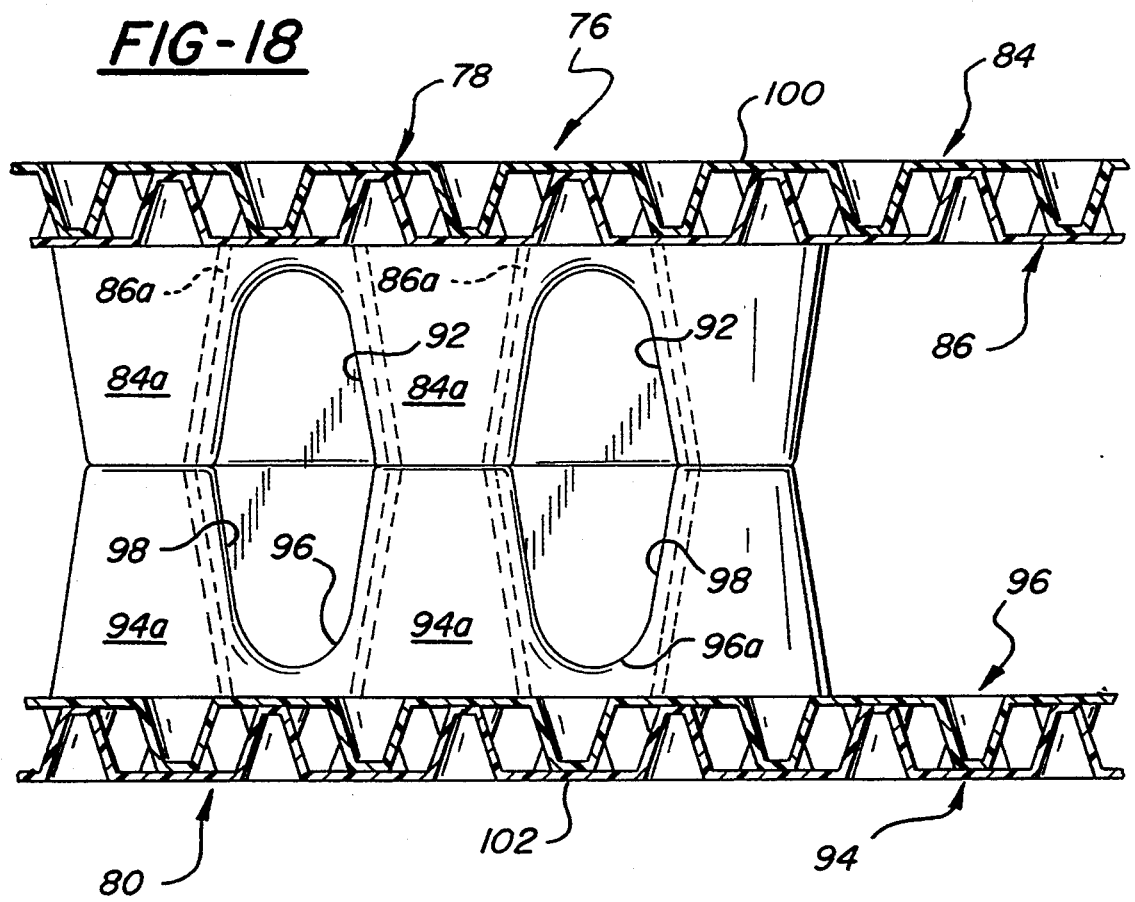
FIG. 18 is a cross-sectional view taken on line 18—18 of FIG. 16.
Figure 19:
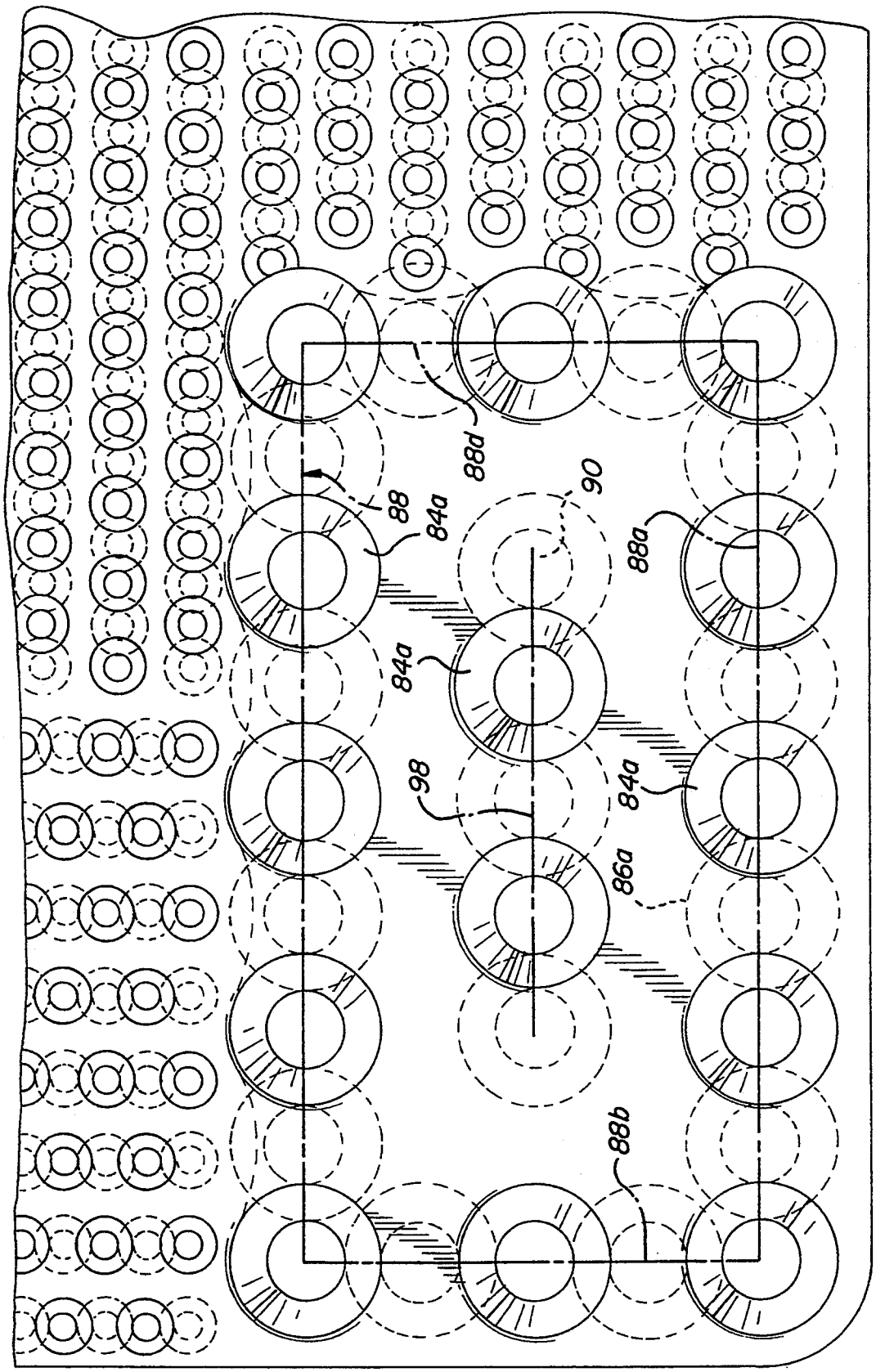
FIG. 19 is a fragmentary top view of the pallet of FIG. 16.

The pallet 76 shown in FIGS. 16–19 is also a double faced pallet utilizing the panel structure of the invention. Specifically, the pallet 76 of FIGS. 16–19 is formed of a twin sheet upper deck structure 78 and a twin sheet lower deck structure or base 80. Deck structures 78 and 80 are identical and the pallet is formed by inverting lower deck structure 80 relative to upper deck structure 78 and fusing the decks together at their interfaces to form forklift passageways 82. Deck 78 is formed of upper and lower thermoformed plastic sheets 84 and 86. Sheets 84 and 86 are formed over the majority of their surface areas (with the exception of the areas corresponding to the legs or columns of the pallet) in a manner to duplicate the structure of the panel of FIG. 1 with the upper and lower sheets providing downwardly extending and upwardly extending intermeshing bosses to provide rigid columns extending the width of the pallet in the manner described with respect to the panel structure of FIG. 1. As best seen in FIG. 19, the columns formed by the intermeshing upwardly and downwardly extending bosses on the upper and lower sheets may be arranged to run from left to right of the pallet as viewed in FIG. 16 except for border portions along the left and right borders of the pallet as viewed in FIG. 16 where the columns may be arranged to run from bottom to top of the pallet.

The upper and lower sheets 84 and 86 also provide downwardly and upwardly extending intermeshing bosses in the regions corresponding to the legs or columns of the pallet but the bosses in these regions are much larger than the bosses in the main deck region of the upper deck section 76. Specifically, upper sheet 84 is configured in each leg region to provide a plurality of large downwardly extending upwardly opening bosses 84a having side walls meshingly coacting with and fused to the side walls of large upwardly extending downwardly opening bosses 86a of the lower sheet 86. As best seen in FIG. 19, the intermeshing, fused together bosses in each leg or column section of the pallet are arranged in a rectangular configuration so that the upwardly and downwardly extending bosses coact to form a rectangular wall or column represented by the dash line 88 in FIG. 19 with further bosses provided within the wall 88 to provide a linear column or wall 98 encircled by the rectangular column or wall 88. The wall 88 is solid along its outer peripheral sides 88a and 88b but, as best seen in FIG. 18, defines openings 92 between the bosses along the inner wall portion 88c and 88d. Openings 92 do not extend completely through the wall portion 88c and 88d but rather simply open up in the interior of the associated upwardly extending boss 86a.

As indicated, lower deck 80 is identical to upper deck 78 and comprises a twin sheet structure including a lower sheet 94 coacting with an upper sheet 96 to define the main body intermeshing boss panel structure of the deck with enlarged upwardly and downwardly extending bosses 94a and 96a provided in the leg or column regions of the pallet in the pattern shown in FIG. 19 so that, as with the upper deck 78, each leg or column section of the lower deck defines a rectangular wall or column with a linear column positioned within the rectangular column and with openings 98 in the downwardly extending bosses forming the inner walls of the rectangular column opening into the interior of the respective boss in the manner described with respect to the openings 92. The completed pallet defines a load receiving surface 100 at the upper face of the upper deck and defines a flat lower surface 102 at the lower face of the lower deck to support the pallet.

The invention will be seen to provide a panel structure that is lightweight, strong, durable and maintenance-free, provides all-weather performance, and is relatively inexpensive. The invention panel structure is thereby ideally suited for a myriad of construction and fabricating applications.

More specifically, pallets constructed in accordance with the invention have been found to have superior structural strength as compared to prior art twin sheet pallets and even as compared to applicant's improved prior art twin sheet pallet shown in U.S. Pat. No. 4,879,956. Specifically, as compared to prior art twin sheet pallets, the invention design enables the invention pallet to be constructed utilizing significantly less plastic material than the prior art twin sheet designs while providing the same structural strength. Since the plastic material constitutes a significant part of the cost of a twin sheet pallet, a significant reduction in the amount of material required to meet any particular structural requirement enables the entire pallet to be manufactured at a cost significantly less than pallets of the described prior art twin sheet design.

Whereas the particular plastic material utilized to form the invention pallet is not critical, it has been found that excellent results may be obtained by the use of a high density polyethylene having a density of approximately 0.950 grams per cubic centimeter.

Whereas preferred embodiments of the invention have been illustrated and described in detail, it will be apparent that various changes may be made in the disclosed embodiments without departing from the scope or spirit of the invention. For example, although the bosses have been illustrated and described as having a circular cross-sectional configuration, other cross sectional configurations such as, but not limited to, rectangular or oval configurations, may be employed and the term annular as used in the claims to describe the side walls of the bosses will be understood to include any closed loop cross-sectional configuration.

I claim:

1. A method of forming a twin sheet plastic panel structure comprising:

forming a first plastic sheet by heating the sheet to a heated, flowable state and thermoforming the heated, flowable sheet to include a generally planar main body portion having inner and outer surfaces and a plurality of spaced hollow bosses opening in the outer surface of the main body portion and each including an annular side wall portion extending inwardly from the inner surface of the main body portion and an inner wall portion at the inner end of the annular side wall portion;

forming a second plastic sheet by heating the sheet to a heated, flowable state and thermoforming the heated, flowable sheet to include a generally planar main body portion having inner and outer surfaces and a plurality of spaced hollow bosses opening in the outer surface of the second sheet main body portion and each including an annular side wall portion having a height substantially equal to the height of the annular side wall portions of the first sheet bosses and extending inwardly from the inner surface of the second sheet main body portion and an inner wall portion at the inner end of the side wall portion; and with said sheets still in a heated, flowable state, bringing said sheets together to fuse the annular side wall portions of some of said first sheet bosses to the annular side wall portions of some of said second sheet bosses;

the configurations of the side wall portions of the first and second sheet bosses providing an interference fit as between the side wall portions of the first and second sheet bosses when the sheets are brought together so that the fusion of the first and second sheet side wall portions occurs along a relatively wide area adjacent the initial line of contact between the first and second sheet annular side wall portions.

2. A method according to claim 1 wherein the step of bringing said sheets together further includes fusing the inner wall portions of the first sheet bosses to the inner surface of the main body portion of the second sheet and fusing the inner wall portions of the second sheet bosses to the inner surface of the main body portion of the first sheet.

3. A method according to claim 2 wherein the first sheet bosses and second sheet bosses are arranged in parallel rows with the bosses in each row laterally spaced from each other and said step of bringing said sheets together includes positioning the bosses in a row of said first sheet interdigitally with respect to the bosses in a corresponding row of the second sheet so that each row of the panel structure includes alternate first sheet bosses and second sheet bosses.

4. A method according to claim 1 wherein the first sheet bosses are provided in a defined grouping, the second sheet bosses are provided in a defined grouping complementary to the grouping of the first sheet bosses, and the step of bringing the sheets together further includes positioning the first sheet bosses in a complementary interdigitated relation with respect to the second sheet bosses with side wall portions of the first sheet bosses contiguous to side wall portions of second sheet bosses and fusing side wall portions of said first sheet bosses to the contiguous side wall portions of said second sheet bosses.

5. A method of forming a twin sheet plastic panel structure comprising:

forming a first plastic sheet by heating the sheet to a heated, flowable state and thermoforming the heated, flowable sheet to include a generally planar main body portion having inner and outer surfaces and a plurality of spaced hollow bosses opening in the outer surface of the main body portion and each including an annular side wall portion extending inwardly from the inner surface of the main body portion and an inner wall portion at the inner end of the annular side wall portion;

forming a second plastic sheet by heating the sheet to a heated, flowable state and thermoforming the heated, flowable sheet to include a generally planar main body portion having inner and outer surfaces and a plurality of spaced hollow bosses opening in the outer surface of the second sheet main body portion and each including an annular side wall portion having a height substantially equal to the height of the annular side wall portions of the first sheet bosses and extending inwardly from the inner surface of the second sheet main body portion and an inner wall portion at the inner end of the side wall portion; and with said sheets still in a heated, flowable state, bringing said sheets together to fuse inner wall portions of said first sheet bosses to the inner surface of said second sheet main body portion at locations between adjacent second sheet bosses, fuse inner wall portions of said second sheet bosses to the inner surface of said first sheet main body portion at locations between adjacent second sheet bosses, and fuse the annular side wall portions of some of said sheet bosses to the annular side wall portions of some of said second sheet bosses;

the configurations of the side wall portions of the first and second sheet bosses providing an interference fit as between the side wall portions of the first and second sheet bosses when the sheets are brought together so that the fusion of the first and second sheet side wall portions occurs along a relatively wide area adjacent the initial line of contact between the first and second sheet annular side wall portions.

6. A method according to claim 5 wherein the bosses of said first and second sheets are arranged in generally parallel laterally extending rows with the bosses in each row laterally spaced from each other and said step of bringing said sheets together includes positioning the bosses in a row of said first sheet in interdigital relation with respect to the bosses in a corresponding row of the second sheet, so that said panel structure includes bosses arranged in parallel rows with each row including alternate first sheet bosses and second sheet bosses, and fusing the side wall portions of some of the first sheet bosses in a given row to the side wall portions of some of the second sheet bosses in the given row.

7. A method of forming a twin sheet plastic pallet comprising:

forming an upper plastic sheet by heating the sheet to a heated, flowable state and thermoforming the heated, flowable sheet to include a generally planar main body portion having upper and lower surfaces and a plurality of spaced hollow bosses opening in the upper surface of the main body portion and each including an annular side wall portion extending downwardly from the inner surface of the main body portion and a bottom wall portion at the lower end of the annular wall portion;

forming a lower plastic sheet by heating the sheet to a heated, flowable state and thermoforming the heated, flowable sheet to include a plurality of planar main body portions having upper and lower surfaces and a plurality of spaced hollow bosses opening in the lower surface of the lower sheet main body portion and each including an annular side wall portion having a height substantially equal to the height of the annular side wall portions of the upper sheet bosses and extending upwardly from the upper surface of the second sheet main body portion and a top wall portion at the upper end of the side wall portion; and with said sheets still in a heated, flowable state, bringing said sheets together to fuse the annular side wall portions of some of said upper sheet bosses to the annular side wall portions of some of said lower sheet bosses;

the configurations of the side wall portions of the upper and lower sheet bosses providing an interference fit as between the side wall portions of the upper and lower sheet bosses when the sheets are brought together so that the fusion of the upper and lower sheet side wall portions occurs along a relatively wide area adjacent the initial line of contact between the upper and lower sheet annular side wall portions.

8. A method according to claim 7 wherein the step of bringing said sheets together includes positioning at least some of said downwardly extending bosses on said upper sheet in spaces between adjacent upwardly extending bosses on said lower sheet while fusing the bottom wall portions of the downwardly extending bosses to the upper surface of the lower sheet main body portion and fusing top wall portions of the upwardly extending bosses to the lower surface of the main body portion of said upper sheet.

9. A method according to claim 8 wherein the bosses on said upper and lower sheets are arranged in generally parallel laterally extending rows with the bosses in each row laterally spaced from each other and the step of bringing said sheets together includes positioning the bosses in a row of said upper sheet in interdigital relation with respect to the bosses in a corresponding row of the lower sheet so that the pallet includes parallel rows of bosses with each row including alternate upper sheet bosses and lower sheet bosses.

10. A method according to claim 7 wherein the fused together upper and lower sheets coact to define a platform structure of the pallet and wherein the method further includes the step of forming said upper and lower sheets so that, when brought together, they further coact to define a plurality of spaced legs extending downwardly from the platform structure to position the platform structure in upwardly spaced relation to a support surface on which the legs are positioned.

11. A method of forming a twin sheet plastic pallet comprising:

forming an upper plastic sheet by heating the sheet to a heated, flowable state and thermoforming the heated, flowable sheet to include a generally planar main body portion having upper and lower surfaces and a plurality of spaced hollow bosses opening in the upper surface of the main body portion and each including an annular side wall portion extending upwardly from the lower surface of the main body portion and a bottom wall portion at the lower end of the side wall portion;

forming a lower plastic sheet by heating the sheet to a heated, flowable state and thermoforming the heated, flowable sheet to include a generally planar main body portion having upper and lower surfaces and a plurality of spaced hollow bosses opening in the lower surface of the lower sheet main body portion and each including an annular side wall portion having a height substantially equal to the height of the annular side wall portions of the upper sheet bosses and extending upwardly from the upper surface of the lower sheet main body portion and a top wall portion at the upper end of the annular side wall portion; and with said sheets still in a heated flowable state, bringing said sheets together to fuse bottom wall portions of said upper sheet bosses to the upper surface of said lower sheet main body portion at locations between adjacent lower sheet bosses, fuse top wall portions of the lower sheet bosses to the lower surface of said upper sheet main body portion at locations between adjacent upper sheet bosses, and fuse the annular side wall portions of some of said upper sheet bosses to the annular side wall portions of some of said lower sheet bosses;

the configurations of the side wall portions of the upper and lower sheet bosses providing an interference fit as between the side wall portions of the upper and lower sheet bosses when the sheets are brought together so that the fusion of the upper and lower sheet side wall portions occurs along a relatively wide area adjacent the initial line of contact between the upper and lower sheet annular side wall portions.

12. A method according to claim 11 wherein the upper sheet bosses are provided in a defined grouping, the lower sheet bosses are provided in a defined grouping complementary to the grouping of the upper sheet bosses, and the step of bringing said sheets together further includes positioning the upper sheet bosses in complementary interdigitated relation with respect to the lower sheet bosses with side wall portions of the upper sheet bosses contiguous to side wall portions of the lower sheet bosses and fusing annular side wall portions of said upper sheet bosses to the contiguous annular side wall portions of said lower sheet bosses.

13. A method according to claim 11 wherein the upper and lower sheet bosses are arranged in generally parallel laterally extending rows with the bosses in each row laterally spaced from each other and the step of bringing the sheets together includes positioning annular side wall portions of bosses in a row of the upper sheet in contiguous interdigital relation with respect to annular side wall portions of bosses in a corresponding row of the lower sheet and fusing the contiguous annular side wall portions together so that the pallet include a plurality of parallel rows of fused together bosses with each row including alternate upper and sheet bosses and lower sheet bosses.

14. A method according to claim 11 wherein the fused together upper and lower sheets coact to define a platform structure and wherein the method includes the further step of forming said upper and lower sheets so that when the sheets are brought together they coact to further define a plurality of spaced legs extending downwardly from the platform structure to position the platform structure in upwardly spaced relation to a support surface on which the legs are positioned.

* * * * *